Patented Mar. 2, 1937

2,072,810

UNITED STATES PATENT OFFICE 2,072,810

SYNTHETIC RESIN AND METHOD OF PRODUCING

Hayward H. Coburn, Springfield, Pa., assignor to Hercules Powder Company, Wilmington, Del., a corporation of Delaware No Drawing. Application January 12, 1935, Serial No. 1,499

18 Claims. (Cl. 260—8)

This invention relates to a new composition of matter and method for its production.

In accordance with this invention a novel synthetic resin, having characteristics rendering it valuable for use variously in the commercial arts, is prepared by reacting together dipentene, maleic anhydride and rosin or abietic acid. The reaction involved is probably explained on the basis of the unsaturated bond of the maleic anhydride reacting with the unsaturated bonds of the dipentene and the abietic acid. The new composition is a highly acidic material of complex nature.

In preparing the synthetic resin in accordance with my invention the reagents may be reacted in widely varying proportions depending upon the physical characteristics desired for the resin product with consideration to the use to which it is to be put. Generally speaking, it is desirable to employ maleic anhydride approximately in the proportion necessary to completely satisfy the reactivity of the dipentene and the abietic acid. Thus, for example, with use of relatively large amounts of dipentene, the product is soft and tough, with more abietic acid in proportion to dipentene, the product is hard and brittle, and so on, it being clear that by varying the proportions and amounts of the reagents products having varying characteristics may be produced. As illustrative, for example, dipentene may be used within the range 0.1 to 0.9 moles, maleic anhydride within about the range 0.2 to 2.0 moles and abietic acid within about the range 0.1 to 0.9 moles.

Dipentene comprises the major portion of a terpene cut boiling within the range 170-178° C. obtained by fractionation of crude turpentine from the *Pinus palustris*, and this terpene cut may be used in place of pure dipentene within the scope of this invention. However, it is preferred to use a pure dipentene boiling at 174.5–177.5° C., which may be obtained as a middle cut between pine oil and turpentine.

In preparing the improved synthetic resin the reagents will be reacted in the presence of heat. However, it will be expressly understood that any means for effecting the reaction is contemplated as within the scope of this invention. Any suitable temperature may be used, though a temperature within the range (say) about 125–250° C. is desirable. The reaction will usually be carried out under atmospheric pressure, but with variations of temperature procedure under reduced or super-pressure will obviously be within the scope of my invention. The production of the resin in accordance with this invention may be carried out in any suitable apparatus, as any suitable container in which the reagents may be heated. On completion of the reaction any volatile unreacted matter may be removed or separated from the product by the application of a vacuum to the reaction mass before cooling.

As a specific illustration, for example, 100 parts by weight of dipentene, 165 parts of abietic acid and 98 parts of maleic anhydride are heated together at a temperature of approximately 200° C. for about 3 hours. The pressure on the reaction mass is then reduced to about 15 mm. of mercury and any unreacted maleic anhydride and the inert ingredients associated with the dipentene are distilled off.

The reaction product obtained by the above procedure will be found to have a direct acid number of about 230, saponification value of about 414, melting point (drop method) of about 95° C. and a rhodanometric iodine value of 23.1.

As illustrative of various amounts of the several reagents which may be reacted to produce resins in accordance with this invention, for example, the reagents may be reacted in the various proportions given in the following table:

| Dipentene | Rosin | Maleic anhydride |
|---|---|---|
| Parts by weight | Parts by weight | Parts by weight |
| 188 | 20 | 98 |
| 175 | 42 | 98 |
| 150 | 83 | 98 |
| 50 | 250 | 98 |

The several reagents in, for example, the proportion given in the above table may be reacted in any suitable container, at a temperature (say) within the range of 150° C.–250° C. for (say) one to five hours. Volatile unreacted matter may, as has been indicated, be removed on completion of the reaction by reducing the pressure in the reaction mass before cooling.

The product in accordance with this invention will be found to be a highly acidic resin, capable, for example, of reacting with alcohols, as, for example, polyhydric alcohols as glycerol, aliphatic glycols, etc., to yield synthetic gums or resins which have characteristics making them highly desirable for use, for example, in varnishes, lacquers, etc., etc.

As an example of the esterification of the product obtained in the specific illustration above with a polyhydric alcohol the following is illustrative: about 100 parts by weight of any of the above reaction products and 58 parts of glycerol are heated at a temperature of 200° C. for 6 hours followed by heating at 250° C. for one hour. The resulting resin has an acid number of 30 and a melting point (drop method) of approximately 113° C. It is highly desirable for use in lacquers and varnishes. Drying or semi-drying oils or their acids may be added.

Esterification with monohydric alcohols, as methyl, ethyl, butyl alcohols, etc., may likewise be carried out, in the case of low boiling alcohols preferably under pressure.

It will be understood that in producing the compositions comprising this invention abietic acid as such may be used or rosin, either wood or gum, preferably high in abietic acid content may be used equivalently.

It is also contemplated to use in place of abietic acid other compounds containing the abietyl radical such as, for example, esters of abietic acid with monohydric or polyhydric alcohol as methyl, ethyl, propyl alcohols, glycol, glycerol, etc. When an ester of abietic acid is employed, the acidity of the reaction product is lower due to the fact that one carboxyl group is esterified.

As a specific illustration, for example, of the use of an ester of abietic acid, 100 parts by weight of dipentene, 158 parts of methyl abietate and 98 parts of maleic anhydride are heated together at a temperature of about 200° C. for three hours. The pressure is then reduced to 15 mm. of mercury and the excess of maleic anhydride and the inert ingredients associated with the dipentene are removed.

It will be understood also that maleic acid is contemplated as an operable equivalent of maleic anhydride in the reaction within the scope of this invention.

This application is a continuation in part of the application filed by me Serial No. 694,063, filed October 18, 1933, now Patent 2,047,004.

What I claim and desire to protect by Letters Patent is:

1. A synthetic resin comprising a reaction product of an alcohol and an acidic composition comprising a reaction product of the reaction of dipentene, maleic anhydride and a compound containing the abietyl radical.

2. A synthetic resin comprising a reaction product of an alcohol and an acidic composition comprising a reaction product of the reaction of dipentene, maleic anhydride and abietic acid.

3. A synthetic resin comprising a reaction product of an alcohol and an acidic composition comprising a reaction product of the reaction of dipentene, maleic anhydride and an abietic acid ester.

4. A synthetic resin comprising a reaction product of an alcohol and an acidic composition comprising a reaction product of the reaction of dipentene, maleic anhydride and rosin.

5. A synthetic resin comprising a reaction product of a polyhydric alcohol and an acidic composition comprising a reaction product of the reaction of dipentene, maleic anhydride and a compound containing the abietyl radical.

6. A synthetic resin comprising a reaction product of a monohydric alcohol and an acidic composition comprising a reaction product of the reaction of dipentene, maleic anhydride and a compound containing the abietyl radical.

7. A synthetic resin comprising a reaction product of glycerol and an acidic composition comprising a reaction product of the reaction of dipentene, maleic anhydride and a compound containing the abietyl radical.

8. A synthetic resin comprising a reaction product of an aliphatic glycol and an acidic composition comprising a reaction product of the reaction of dipentene, maleic anhydride and a compound containing the abietyl radical.

9. A synthetic resin comprising a reaction product of ethyl alcohol and an acidic composition comprising a reaction product of the reaction of dipentene, maleic anhydride and a compound containing the abietyl radical.

10. A synthetic resin produced by combining a polyhydric alcohol, a drying oil fatty acid, and a reaction product formed by combining dipentene, maleic anhydride and a compound containing the abietyl radical.

11. The method for producing a synthetic resin which includes reacting dipentene, maleic anhydride and a compound containing the abietyl radical and of a character such that the abietyl radical is available for reaction, and then reacting the product of said reaction with an alcohol.

12. The method for producing a synthetic resin which includes reacting dipentene, maleic anhydride and abietic acid and then reacting the product of said reaction with an alcohol.

13. The method for producing a synthetic resin which includes reacting dipentene, maleic anhydride and an abietic acid ester of a character such that the abietyl radical is available for reaction and then reacting the product of said reaction with an alcohol.

14. The method for producing a synthetic resin which includes reacting dipentene, maleic anhydride and rosin and then reacting the product of said reaction with an alcohol.

15. A coating composition comprising a reaction product of an alcohol and an acidic composition formed from dipentene, maleic anhydride and a compound containing the abietyl radical, and a solvent.

16. A coating composition comprising a reaction product of an alcohol and an acidic composition formed from dipentene, maleic anhydride and a compound containing the abietyl radical, a non-volatile lacquer ingredient and a solvent.

17. A coating composition comprising a reaction product of an alcohol and an acidic composition formed from dipentene, maleic anhydride and a compound containing the abietyl radical, a non-volatile varnish ingredient and a solvent.

18. A synthetic resin comprising a reaction product of an alcohol and an acidic composition comprising a reaction product of the reaction of a terpene cut boiling within the range 170°–178° C., maleic anhydride and a compound containing the abietyl radical.

HAYWARD H. COBURN.